3,429,945
COMPOSITION AND METHOD OF COATING WITH A MIXTURE OF STYRENE-ALLYL ALCOHOL COPOLYMER, EPOXY RESIN AND PHOSPHORIC ACID
John W. Forsberg and Richard W. Jahnke, Mentor-on-the-Lake, Ohio, assignors to The Lubrizol Corporation, Wickliffe, Ohio, a corporation of Ohio
No Drawing. Filed Oct. 18, 1965, Ser. No. 497,485
U.S. Cl. 260—836                                15 Claims
Int. Cl. C08g 45/04, 51/74

ABSTRACT OF THE DISCLOSURE

The combination of (A) a mixture of a copolymer of allyl alcohol and a styrene, an epoxy aryl ether, and phosphoric acid, and (B) a metal salt of the reaction product of phosphoric acid and an organic epoxide, provides an effective coating for metal surfaces.

---

This invention relates to novel compositions. In a more particular sense, it relates to novel phosphorus- and metal-containing compositions which are useful to provide protective films for metal surfaces, and to the metal articles which have been coated with these compositions.

The corrosion of metal surfaces is of obvious economic significance in many industrial applications, and as a consequence the inhibition of such corrosion is a matter of prime consideration. It is particularly significant to users of steel and other ferrous alloys. The corrosion of such ferrous metal alloys is largely a matter of rust formation which in turn involves the overall conversion of the free metal to its oxide.

The treatment of metal surfaces, especially ferrous metal surfaces, to provide them with protective, chemical coatings has long been known. These protective coatings may either be permanent, i.e., they cannot be removed by ordinary handling or minor abrasive wear, or temporary in that they may be more easily removed. The permanent type of coating is provided usually by treatment with an acidic, inorganic chemical solution which reacts with the metal surface to form an integral coating. The temporary coatings are deposited as films from solutions of a film-forming material and a relatively volatile solvent. Although films of this type are not as permanent, they do have the important advantage of much more efficient application.

It will be seen, therefore, that while each of these types of protective films for metal surfaces enjoys a particular advantage, each suffers also from a disadvantage. The integral, chemically reacted film obtained from an aqueous acidic solution is inherently expensive because of the inefficiency of its application while the residual film obtained from a solution in a relatively volatile organic solvent is not as permanent as might be desired.

In any event, such coating solutions have been useful in providing an adherent coating on metal articles, thereby improving the adhesion thereto of a film of a subsequently applied siccative organic coating composition. However, the use of the prior art coating compositions has been seriously curtailed in some applications for one or more of the following reasons: (1) the acidic, inorganic chemical solutions required that the solution be maintained at temperatures at least about 150° F., and (2) metal surfaces which have been coated by the above processes could not be welded satisfactorily. Conventional commercial protective coatings appear to interfere with the passage of the welding current and result in poor welds and/or premature destruction of the electrodes by excessive arcing.

Furthermore, metal articles which have been coated with the prior art coated compositions have not been able to withstand forming and cold drawing operations. Hence, the metal article must be formed or drawn before it is coated with the protective composition of the prior art. This adds to the cost of finishing the metal article since the formed article may be of such dimensions and shape that it cannot be coated conveniently over its entire surface by ordinary commercial procedures. It should be obvious that there has been a definite need for a coating composition which can be easily applied to metal surfaces and which can be easily formed, drawn or welded.

Accordingly, it is an object of this invention to provide novel coating compositions.

Another object is to provide novel coating compositions which are adapted for coating metal surfaces.

Another object is to provide novel phosphorus- and metal-containing compositions.

Another object is to provide metal surfaces which have been provided with an adherent phosphorus- and metal-containing composition.

Another object is to provide metal surfaces which have been provided with an adherent coating composition which is effective to inhibit corrosion of the metal.

Another object is to provide metal surfaces which have been provided with an adherent coating composition which is effective to improve the drawing properties of the metal.

Another object is to provide metal surfaces which have been provided with an adherent coating composition which does not interfere with the weldability of the metal.

Still another object is to provide metal surfaces which have been provided with an adherent coating composition which is effective to improve the drawing properties of the metal and which coating does not diminish the weldability of the metal.

A further object is to provide metal surfaces which have been provided with an adherent coating which effectively prevents corrosion, improves the drawing properties of the metal, does not interfere with the weldability of the metal, and when free of drawing lubricants and other industrial soils, serves as an excellent base for paints.

These and other objects of the invention are achieved by means of a phosphorus- and metal-containing composition comprising:

(A) A composition comprising a mixture of one part of a copolymer of allyl alcohol and a styrene, said copolymer having an average molecular weight of from about 500 to about 2500, from about 0.05 to about 5.0 parts of an epoxy aryl ether, and from about 0.1 to about 2.0 parts of phosphoric acid, and (B) A metal salt obtained by reacting from about 0.2 to about one mole of a metal base with one mole of a phosphorus acid obtained by reacting one mole of phosphoric acid and up to about 6 moles of an organic epoxide, the weight ratio of component (A) to component (B) being within the range of from about 1:1 to 20:1.

The phosphorus- and metal-containing composition of this invention generally are prepared by mixing components (A) and (B) which have been prepared separately.

Component (A) is a composition comprising a mixture of a copolymer of allyl alcohol and a styrene, an epoxy aryl ether, and phosphoric acid, generally comprising one part of a copolymer of allyl alcohol and a styrene, from about 0.05 to about 5 parts of an epoxy aryl ether, and from about 0.1 to about 2.0 parts of phosphoric acid. The copolymer of allyl alcohol and a styrene preferably is a low molecular weight copolymer prepared from an approximately equimolar mixture of the two monomers. The molecular weight of the copolymer should be within the range of from about 500 to about 2500. The styrene monomer may be styrene itself or any of the various substituted styrenes such as monochloro styrene, alkyl-substituted styrene, and alpha-substituted styrene wherein the substituent is preferably an alkyl group such as methyl.

The epoxy aryl ethers are compounds which contain both epoxy groups and aryl ether groups. They are prepared by the reaction of epichlorohydrin with phenolic compounds. For example, the reaction of epichlorohydrin with amyl phenol produces an epoxy aryl ether having the structure

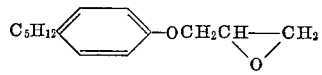

Ordinarily, for the purposes of this invention, the phenolic compound is bis-phenol A (di-hydroxyphenyl dimethyl methane), or a phenol-formaldehyde resin, or some such aldehyde-phenol resin. A large number of such epoxy aryl ethers are commercially available under a variety of trade names. Particular methods for the preparation of such epoxy aryl ethers are disclosed in U.S. Patents 2,503,726; 2,582,985; 2,592,560; and 2,694,694. Other phenols may be used, and polyhydric phenols are preferred. In addition to epichlorohydrin, various other halohydrins may be used such as epibromohydrin and the epihalohydrins of mannitol, sorbitol and erythritol. The preferrred epoxy aryl ethers of this invention are those which contain on the average more than one epoxy group and more than one aryl ether group per molecule.

The phosphoric acid used in the preparation of component (A) is generally an 85% aqueous phosphoric acid solution. More concentrated phosphoric acid solutions can be used, and in some instances, it is preferred to use 100% phosphoric acid, or an even more concentrated form of phosphorus pentoxide. In some instances, it is desirable to use less concentrated phosphoric acid solutions such as, for example, 60% phosphoric acid or 25% phosphoric acid.

The manner in which component (A) is prepared is not critical. Generally, the copolymer is mixed with the epoxy aryl ether prior to the addition of the phosphoric acid. The addition of the phosphoric acid to this mixture results in an exothermic reaction. Use of solvents such as methyl isobutyl ketone, isobutyl alcohol and butyl Cellosolve help to solubilize the ingredients and facilitates control of the temperature during the mixing operation.

The following seven examples illustrate the methods of preparing component (A). A more complete discussion of the preparation of component (A) is set forth in U.S. Patent No. 3,133,838.

EXAMPLE 1

A solution of 54 parts of a copolymer (molecular weight: 1100) of equimolar proportions of allyl alcohol and styrene in 54 parts of methyl isobutyl ketone is added to a solution of 41.4 parts of an epoxy aryl ether (molecular weight: 950) prepared by the reaction of di-hydroxyphenyl dimethyl methane and epichlorohydrin, in 14 grams of a 2:1 mixture of methyl isobutyl ketone and xylene. To the resulting solution there is added 336 parts of a 2:1:1 mixture of methyl isobutyl ketone, ethyl acetate and isobutyl alcohol. To this solution there is then added 100 grams of 85% aqueous phosphoric acid.

EXAMPLE 2

The procedure of Example 1 is repeated except that the ratio of allyl alcohol-styrene copolymer/epoxy aryl ether/phosphoric acid is 1.00/0.76/0.33.

EXAMPLE 3

The procedure of Example 1 is repeated except that the ratio of allyl alcohol-styrene copolymer/epoxy aryl ether/phosphoric acid is 1.00/0.86/0.20.

EXAMPLE 4

The procedure of Example 1 is repeated except that the epoxy aryl ether is a condensation product (molecular weight: 600) of chemically equivalent amounts of epichlorohydrin and a phenol-formaldehyde resin, and the ratio of allyl alcohol-styrene copolymer/epoxy aryl ether/phosphoric acid is 1.00/1.10/0.58.

EXAMPLE 5

The procedure of Example 1 is followed except that the molecular weight of the allyl alcohol-styrene copolymer is 1900.

EXAMPLE 6

A solution of 200 parts of a copolymer (molecular weight: 1580) of equimolar proportions of allyl alcohol and styrene in 200 parts of butyl Cellosolve is prepared and heated to 108° C. in 1.4 hours. The solution is cooled to 50° C. and an additional 5.5 parts of butyl Cellosolve is added. An epoxy aryl ether (210 parts)/(molecular weight: 950) prepared by the reaction of di-hydroxyphenyl dimethyl methane and epichlorohydrin is added to the solution for a period of 2.5 hours while maintaining the temperature of the mixture at 50°–55° C. To this mixture there is added over a period of 13.5 hours, 82.7 parts of 85% phosphoric acid and the mixture maintained at 48° C. for an additional 2 hours to give the desired product, a 62% solution in butyl Cellosolve.

EXAMPLE 7

A solution of 200 parts of butyl Cellosolve and 200 parts of the copolymer of Example 1 is prepared at 65° C. in 2 hours. This solution is heated to 107° C. in 1.8 hours and cooled to 55° C. whereupon 204.4 parts of the epoxy aryl ether of Example 6 is added in 2 hours while maintaining the temperature of the mixture at 46–52° C. The solution is maintained at a temperature of about 50° C. while 78.4 parts of commercial 85% phosphoric acid is added slowly. At the end of 2 hours, the reaction temperature is 55° C. The phosphoric acid addition is stopped for 2 hours until the mixture is cooled to 50° C. whereupon the remainder of the phosphoric acid is added in one hour. The material is mixed for an additional 2 hours at 50° C. to give the desired product, a 62% solution in butyl Cellosolve.

Component (B) is a metal salt obtained by reacting a metal base with a phosphorus acid obtained by reacting phosphoric acid with an organic epoxide. Generally, from about 0.2 to about 1 mole of the metal base is used for every mole of phosphorus acid. The metal bases which have been found useful in the preparation of component (B) include the various bases of the alkali metals, alkaline earth metals, zinc, cadmium, manganese, iron, cobalt, copper, tin and aluminum. The bases include the oxides, hydroxides, sulfides, carbonates, and alkoxides of the above-named metals. For example, the metal salt may be obtained by reacting the phosphorus acid with zinc oxide, zinc hydroxide, sodium oxide, lithium hydroxide, zinc sulfide, barium carbonate, and manganese carbonate.

The phosphorus acid useful in the preparation of component (B) is obtained by reacting one mole of phosphoric acid with up to about 6 moles of an organic epoxide. The organic epoxides, i.e., compounds containing at least one

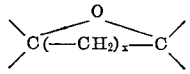

linkage where $x$ is 0 or a small integer, suitable for the purpose of this invention include the various substituted and unsubstituted alkylene oxides containing at least 2 and as many as 60 or more aliphatic carbon atoms. Examples of such epoxides include ethylene oxide, 1,2-propylene oxide, 1,3-propylene oxide, 1,2-butylene oxide, pentamethylene oxide, hexamethylene oxide, 1,2-octylene oxide, cyclohexene oxide, methyl cyclohexene oxide, styrene oxide, alpha-methyl styrene oxide, beta-propiolactane, butyl epoxy-stearate, and epoxidized soyabean oil. If desired, the organic epoxide may also contain substituents such as, for example, chloro, bromo, fluoro, nitro, nitroso, ether, sulfide and keto groups.

Although it is possible to react up to about 6 moles of an organic epoxide with phosphoric acid, it is preferred generally to react from about 0.5 to about 3 moles of epoxide per mole of phosphoric acid. This reaction is carried out easily at temperatures up to about 100° C. and preferably at a temperature of from about 40°–80° C. for a period of from about one to 10 hours.

The metal salt is obtained by reacting the phosphorus acids described above with the metal base, generally in a solvent such as 1-hexanol or methyl amyl alcohol. In most instances, the phosphorus acid is dissolved in the solvent and the metallic base is added to the solution. The mixture is then heated at a temperature of from about 100°–150° C. while removing the water as it is formed in the reaction. The final traces of water may be removed by heating to a higher temperature or by applying a slight vacuum.

The exact nature of the metal salt obtained by this procedure is not known although it has been established that the product does contain phosphorus and a metal, and is acidic in nature. The relative acidity of the product is determined by the ratio of phosphorus acid to metal base. That is, where the amount of metal base reacted with the phosphorus acid is small, the metal salt is more acidic since it has been neutralized to a lesser degree.

The following examples (Examples 8–32) illustrate the preparation of a number of metal salts encompassed within the description of component (B) of this invention.

EXAMPLE 8

To 1202 parts (12.4 moles) of 100% phosphoric acid there is added over a period of 2.5 hours, 1008 parts (18.6 moles) of propylene oxide while maintaining the reaction temperature at 45°–60° C. During the addition, the reaction mixture is at first cloudy, then clear but dark, and finally light yellow. After all of the propylene oxide is added, the mixture is heated for 2 hours at 60°–80° C. and any volatile material is removed by heating at 80° C./50 mm. for 0.5 hour. The residue is the desired phosphorus acid having a phosphorus content of 17.3%, a hydroxyl content of 10.5%, and a neutralization number (to bromphenol blue) of 350 acid.

A mixture of 185 parts (1 mole) of the phosphorus acid prepared above, 185 parts of 1-hexanol and 81.4 parts (1.0 mole) of zinc oxide is heated for 5 hours at 156° C. while removing the water which is formed in the reaction. After all of the water is removed, the residue is filtered to give the desired product having a phosphorus content of 5.91%, a zinc content of 9.48%, and a neutralization number of 42 acid.

EXAMPLE 9

To 1960 parts (20 moles) of 100% phosphoric acid there is added 1740 parts (30 moles) of propylene oxide over a period of 3.3 hours while maintaining the reaction temperature at 50°–60° C. by placing the reaction flask in a water bath. After all of the propylene oxide is added, the mixture is heated at a temperature of from 60°–80° C. for 1.75 hours and finally at 80° C./30 mm. for 0.25 hour to remove any volatile material. The residue is the desired product having the following analyses: percent phosphorus, 16.5; neutralization number, 359 acid.

A mixture of 925 parts (5 moles) of the phosphorus acid prepared above and 1084 parts of 1-hexanol is heated to 50° C. whereupon 204 parts (2.5 moles) of zinc oxide is added over a 10-minute period. The reaction is exothermic and the reaction temperature reaches about 70° C. After all of the zinc oxide is added, the mixture is heated to 132° C. and finally to 154° C. while removing water. After all of the water is removed, the mixture is cooled to 100° C., a filter aid is added and the mixture is filtered. The filtrate is the desired product having the following analyses: percent phosphorus, 6.73; percent zinc, 6.56; neutralization number, 123 acid.

EXAMPLE 10

Propylene oxide (1740 parts, 30 moles) is added slowly, with stirring, over a period of 3.25 hours to 1470 parts (15 moles) of 100% phosphoric acid. The reaction mixture is maintained at a temperature of from 20°–60° C. during the addition, and then at a temperature of 60°–75° C. for 1 hour. The mixture is heated at 75° C./20 mm. to remove any volatile materials. The residue is the desired phosphorus acid having the following analyses: percent phosphorus, 14.4; neutralization number, 269 acid.

Zinc oxide (204 parts, 2.5 moles) is added over a period of 0.5 hour with stirring to 1070 parts (5.0 moles) of this phosphorus acid while maintaining the temperature below 95° C. After all of the zinc oxide is added, the mixture is heated to 145° C. over a period of 1 hour whereupon nitrogen is bubbled through the mixture to facilitate the removal of the water. The nitrogen bubbling is continued for 2.5 hours at 140°–145° C. and 45 ml. of water is removed. The mixture is cooled to 110° C. At this temperature, the material is an extremely viscous clear fluid. Butyl Cellosolve (821 parts) is added with stirring over a period of 0.5 hour at a temperature of 110°–80° C. and the mixture is filtered. The filtrate is the desired product having the following analyses: percent phosphorus, 7.65; percent zinc, 8.02; neutralization number, 139. This product is completely stable even after 11 months at room temperature.

EXAMPLE 11

Propylene oxide (118 parts, 2.04 moles) is added over a period of 3 hours to 200 parts (2.04 moles) of 100% phosphoric acid. The reaction is exotheric and the temperature of the reaction mixture is allowed to reach 66° C. during the addition. The temperature is maintained at this temperature by cooling the reaction flask with water during the addition. The mixture is heated for 1 hour at this temperature after all of the proyplene oxide is added.

To 290 parts of this material there is added 349 parts of methyl amyl alcohol, and the mixture is heated to 55° C. in 0.5 hour. Zinc oxide (69 parts, 0.85 mole) is added in 1 hour at this temperature. After all the zinc oxide is added, the mixture is heated to 115°–121° C. and maintained at this temperature for 10 hours while removing the water. A filter aid is added and the residue is filtered. The filtrate is a 50% solution of the desired product having the following analyses: percent phosphorus, 8.6; percent zinc, 7.9; neutralization number, 235 acid.

EXAMPLE 12

Propylene oxide (218 parts, 3.75 moles) is added over a period of 1 hour to 490 parts (5.0 moles) of 100% phosphoric acid while maintaining the reaction temperature at 45°–55° C. by means of a water bath. After all the propylene oxide is added, the mixture is heated for 1 hour at a temperature of 55°–65° C. The mixture is then cooled to 35° C. whereupon 867 parts of 1-hexanol is added, and the mixture is stirred for 1.5 hours at this temperature. After heating to 45° C., 204 parts (2.5 moles) of zinc oxide is added over a period of 0.25 hour. The reaction is exothermic to a temperature of 70° C., and the mixture is heated to 145° C. while blowing with nitrogen for 1.25 hours to remove the water. The residue is cooled to a temperature of 80° C. whereupon a filter aid is added and the mixture is filtered. The filtrate is the desired product having the following analyses: percent phosphorus, 8.62; percent zinc, 8.21; neutralization number, 118 acid.

EXAMPLE 13

Propylene oxide (1740 parts, 30 moles) is added over a period of 3.5 hours to 1960 parts (20 moles) of 100% phosphoric acid while maintaining the reaction temperature below 60° C. The mixture is then heated in a steam bath to a temperature of 60°–80° C. for 1.5 hours and then at 80° C./30 mm. for 0.5 hour. The residue is the desired phosphorus acid containing 16.6% phosphorus and having a neutralization number of 326 acid.

To 277.5 parts (1.5 moles) of this phosphorus acid and 291 parts of 1-hexanol, there is added 148 parts (0.75 mole) of barium carbonate over a period of 0.25 hour while maintaining the reaction temperature at 135°–140° C. The mixture is heated at 140°–160° C. for 0.5 hour while removing the water formed in the reaction. A filter aid is added to the residue which is then filtered at 50° C. The filtrate is the desired product having the following analyses: percent phosphorus, 4.39; percent barium, 2.01; neutralization number, 47 acid.

EXAMPLE 14

To a mixture of 370 parts (2.0 moles) of the phosphorus acid prepared in Example 13 and 270 parts of 1-hexanol at a temperature of 40° C., there is added 136 parts (0.67 mole) of aluminum isopropoxide in 10 minutes. The reaction temperature is exothermic to 60° C. and is maintained at this temperature for 3 hours after all of the aluminum isopropoxide is added. The mixture is filtered, and the filtrate is the desired product having the following analyses: percent phosphorus, 8.27; percent aluminum, 1.33; neutralization number, 198.

EXAMPLE 15

A mixture of 555 parts (3.0 moles) of the phosphorus acid of Example 9 and 727 parts of 1-hexanol is heated to 55° C. whereupon 192 parts (1.5 moles) of cadmium oxide is added in 10 minutes. The mixture is heated at 133°–154° C. for 1 hour to remove the water formed in the reaction, and then cooled to 100° C. A filtrate is added and the mixture is filtered. The filtrate is the desired product having the following analyses: percent phosphorus, 4.17; percent cadmium, 1.38; neutralization number, 74 acid.

EXAMPLE 16

A phosphorus acid is prepared according to the procedure of Example 1 by reacting 980 parts (10 moles) of 100% phosphoric acid with 1160 parts (20 moles) of propylene oxide. This acid has the following analyses: percent phosphorus, 14.2; neutralization number, 279 acid.

To 642 parts (3.0 moles) of this acid there is added 697 parts of methyl amyl alcohol and the mixture is heated to 50° C. Manganous oxide (69 parts, 0.75 mole) is added over a period of 5 minutes at a temperature of 50°–55° C. and the mixture is then heated to 120° C. whereupon it is blown with nitrogen for 2 hours to remove the water formed in the reaction. After cooling to 120° C., a filtrate is added and the mixture is filtered. The filtrate is the desired product having the following analyses: percent phosphorus, 7.31; percent manganese, 2.86; neutralization number, 167 acid.

EXAMPLE 17

A phosphorus acid is prepared according to the procedure of Example 1 by reacting 245 parts (2.5 moles) of 100% phosphoric acid with 145 parts (2.5 moles) of propylene oxide. This acid has a phosphorus content of 19.4% and a neutralization number of 406 acid.

A mixture of 624 parts (4.0 moles) of this acid and 490 parts of 1-hexanol is heated to a temperature of 40° C. whereupon 230 parts (2 moles) of manganous carbonate is added slowly over a period of 1.25 hours. The reaction temperature is maintained at 60°–75° C. during the addition and until no more gas is evolved. The residue is an extremely viscous, dark auburn liquid having the following analysis: Percent phosphorus, 10.55; Percent manganese, 5.50; neutralization number, 123 acid.

EXAMPLE 18

Propylene oxide (1740 parts, 30 moles) is added over a period of 2.5 hours to 2940 parts (30 moles) of 100% phosphoric acid maintained at a temperature of from 50°–60° C. After all of the propylene oxide is added, the mixture is heated at 65°–70° C. for 0.5 hour to give the desired phosphorus acid having the following analyses: Percent phosphorus, 19.2; neutralization number, 368 acid.

A mixture of 624 parts (4 moles) of this phosphorus acid and 761 parts of methyl amyl alcohol is prepared and heated to 50° C. Manganous oxide (92 parts, 1.0 mole) is added to the mixture in 5 minutes, and 81 parts (1.0 mole) of zinc oxide is then added over a period of 10 minutes while maintaining the reaction temperature between 50°–65° C. After all of the metal base is added, the mixture is heated to 110° C. and blown with nitrogen for 3.5 hours while water is removed. The mixture is cooled to 100° C. and a filter aid is added, a filtrate is added and the mixture is filtered. The filtrate is the desired product having the following analyses: Percent phosphorus, 8.13; Percent zinc, 4.0; Percent manganese, 0.35; neutralization number, 118 acid.

EXAMPLE 19

The procedure of Example 8 is repeated except that the propylene oxide is replaced by the equivalent amount of 1,2-butylene oxide, and the zinc oxide is replaced by an equivalent amount of sodium oxide.

EXAMPLE 20

The procedure of Example 8 is repeated except that the propylene oxide is replaced by an equivalent amount of ethylene oxide, and the zinc oxide is replaced by an equivalent amount of magnesium oxide.

EXAMPLE 21

Allyl glycidyl ether (570 parts, 5.0 moles) is added over a period of 1.75 hours to 490 parts (5.0 moles) of 100% phosphoric acid while maintaining the reaction temperature between 45°–60° C. After all of the ether is added, the mixture is heated at 60°–75° for 0.5 hour and then at 75° C./15 mm. for 0.25 hour. The residue is the desired phosphorus acid containing 14.4% phosphorus and having a neutralization number of 246 acid.

A mixture of 424 parts (2 moles) of this phosphorus acid and 487 parts of 1-hexanol is prepared and heated to 50° C. whereupon 81 parts (1 mole) of zinc oxide is added in 15 minutes while maintaining the reaction temperature below 68° C. After all of the zinc oxide is added, the mixture is heated to 100° C. in 25 minutes and then to 140° C. in 65 minutes while blowing with nitrogen to remove the water. A filtrate is added and the mixture is cooled to 75° C. and filtered. The filtrate is the desired product having the following analyses: Percent phosphorus, 5.87; Percent zinc, 5.68; neutralization number, 81 acid.

EXAMPLE 22

Styrene oxide (420 parts, 3.5 moles) is added over a period of 2 hours to 343 parts (3.5 moles) of 100% phosphoric acid while maintaining the reaction temperature between 50°–60° C. The mixture is thereafter heated to 70° C. and maintained at a temperature of 70°–75° C. for 1 hour. The phosphorus acid prepared in this manner is found to have a phosphorus content of 13.84% and a neutralization number of 259 acid.

A mixture of 436 parts (2 moles) of this phosphorus acid and 500 parts of 1-hexanol is heated to 50° C. and 82 parts (1 mole) of zinc oxide is added in 15 minutes while maintaining the temperature below 62° C. The mixture is heated to 120° C. while blowing with nitrogen to remove the water formed in the reaction. The residue is filtered and the filtrate is the desired product having the following analyses: Percent phosphorus, 4.74; Percent zinc, 1.98; neutralization number, 79 acid.

EXAMPLE 23

A mixture of 600 parts (1 mole) of an epoxy aryl ether (molecular weight: 600) prepared by the reaction of dihydroxy-phenyl dimethyl methane and epichlorohydrin and 430 parts of methyl amyl alcohol is heated to 60° C. whereupon 98 parts (1 mole) of 100% phosphoric acid is added over a period of 15 minutes while maintaining the reaction temperature below 70° C. The mixture is cooled to 60° C. and 41 parts (0.5 mole) of zinc oxide is added in 5 minutes. The mixture is heated to 90° C. and maintained at a temperature of 90°–95° C. for 1 hour. A filtrate is added and the mixture is filtered at 80° C. The filtrate is the desired product having the following analysis: Percent phosphorus, 2.65; Percent zinc, 1.88; neutralization number, 39 acid.

EXAMPLE 25

A phosphorus acid is prepared by reacting 870 parts (15 moles) of propylene oxide with 490 parts (5 moles) of 100% phosphoric acid at a temperature of 50°–55° C. The product has a phosphorus analysis of 10.7% and a neutralization number of 174 acid.

A mixture of 544 parts (2 moles) of this phosphorus acid and 607 parts of methyl amyl alcohol is heated to 50° C. whereupon 81 parts (1.0 mole) of zinc oxide is added in 5 minutes while maintaining the reaction temperature between 50°–65° C. After all the zinc oxide is added, the mixture is heated to 135° C. while blowing with nitrogen to remove the water formed in the reaction. The mixture is cooled to 125° C. and 25 parts of a filter aid is added. This mixture is filtered and the filtrate is the desired product having the following analyses: Percent phosphorus, 4.85; Percent zinc, 5.22; neutralization number, 65 acid.

EXAMPLE 26

A phosphorus acid is prepared by reacting 490 parts (5 moles) of 100% phosphoric acid with 1450 parts (25 moles) of propylene oxide at a temperature of 50°–60° C. This acid is found to have a phosphorus content of 7.96% and a neutralization number of 48 acid.

A mixture of 388 parts (1 mole) of this acid and 420 parts of methyl amyl alcohol is heated to 50° wherupon 41 parts (0.5 mole) of zinc oxide is added in 5 minutes while maintaining the reaction temperature between 50–60° C. The mixture is then blown with nitrogen while heating to 138° C. to remove the water formed in the reaction. A filter aid (25 parts) is added and the mixture is filtered. The filtrate is the desired product having the following analyses: Percent phosphorus, 2.82; Percent zinc, 2.13.

EXAMPLE 27

A mixture of 454 parts of methyl amyl alcohol and 312 parts (2 moles) of a phosphorus acid prepared by reacting equimolar amounts of propylene oxide and 100% phosphoric acid is heated to 50° C., and 160 parts (1 mole) of red iron oxide pigment ($Fe_2O_3$) is added at 50° C. The mixture is heated to 130° C. while blowing with nitrogen to remove the water formed in the reaction. A filter aid (30 parts) is added to the residue which is then filtered. The filtrate is the desired product having the following analyses: percent phosphorus, 7.11; percent iron, 2.90; neutralization number, 102 acid.

EXAMPLE 28

A phosphorus acid containing 19.2% phosphorus is prepared by reacting equimolar amounts of propylene oxide and phosphoric acid. A mixture of 312 parts (2 moles) of this acid and 437 parts of methyl amyl alcohol is heated to 50° C. whereupon 143 parts (1.0 mole) of cuprous oxide is added in 10 minutes while maintaining the reaction temperature between 50°–55° C. The mixture is then blown with nitrogen for 2 hours while heating to 130° C. to remove the water formed in the reaction. A filter aid (25 parts) is added to the mixture which is then filtered. The filtrate is the desired product containing 5.02% phosphorus and 0.37% copper.

EXAMPLE 29

A mixture of 312 parts (2 moles) of the phosphorus acid described in Example 28 and 429 parts of 1-hexanol is heated to 55° C. whereupon 135 parts (1 mole) of stannous oxide is added in 10 minutes. The mixture is heated to 115°–145° C. and blown with nitrogen for 2 hours to remove the water formed in the reaction, cooled to 75° C. and filtered. The filtrate is the desired product containing 5.79% phosphorus and 0.76% tin.

EXAMPLE 30

A mixture of 369 parts of methyl amyl alcohol and 312 parts (2 moles) of a phosphorus acid containing 19.4% phosphorus prepared by reacting equimolar amounts of propylene oxide and phosphoric acid is heated to 75° C. whereupon 119 parts (1 mole) of cobalt carbonate is added over a period of 0.5 hour. The mixture is blown with nitrogen and heated to 85°–90° C. whereupon the mixture became viscous. An additional 218 parts of methyl amyl alcohol is added, and this mixture is heated at 75°–95° C. for 15 minutes. A filter aid (25 parts) is added, and the mixture is filtered. The filtrate is the desired product.

EXAMPLE 31

A phosphorus- and lithium-containing composition is prepared by reacting 168 parts (4 moles) of lithium hydroxide with 624 parts (4 moles) of the phosphorus acid prepared in Example 28. 1-hexanol (648 parts) is used as the solvent.

EXAMPLE 32

A mixture of 563 parts of methyl amyl alcohol and 468 parts (3 moles) of the phosphorus acid described in Example 30 is heated to 65° C. whereupon 146 parts (1.5 moles) of zinc sulfide is added in 30 minutes while maintaining the reaction temperature between 65°–85° C. The mixture is then heated to 130° C. and the evolved hydrogen sulfide is collected in a dilute sodium hydroxide solution. The mixture is then blown with nitrogen for 2.5 hours at 85°–125° C. and 30 parts of a filter aid is added. The mixture is filtered at 100° C. and the filtrate is the desired product containing 9.2% phosphorus and 1.36% zinc.

As mentioned previously, the compositions of this invention comprise a mixture of components (A) and (B). The weight ratio of components (A) and (B) may be within the range of from about 1:1 to about 20:1 preferably from about 5:1 to about 15:1. These compositions can be employed as such although they usually are employed in solution. The use of a solvent serves not only to insure the solubility of all of the ingredients but also to aid in the deposition of a thin, uniform residual film on treated surfaces. Either volatile or non-volatile solvents may be used, depending upon the manner in which the film-forming composition is applied to the metal surface. When it is desired to coat the metal surface by immersion, relatively volatile solvents such as methyl isobutyl ketone, isobutyl alcohol, ethyl acetate, etc., are desirable and mixtures of such solvents frequently are used. When the coating compositions are to be sprayed onto a metal surface, either volatile or non-volatile solvents may be used. Thus, methyl isobutyl ketone, a volatile solvent, or butyl Cellosolve, a relatively non-volatile solvent, may be used for spraying. When the composition is to be applied by roller coating, it is preferable to use a relatively non-volatile solvent.

The physical properties of the films deposited by the compositions of this invention (e.g., hardness) may be modified by the incorporation of additional components such as colloidal silica or commercial resins capable of effecting the desired change. For example, hydrocarbon resins having a softening point of at least 100° C. are capable of increasing the hardness of the coating composition. Increased firmness of the coating is desired where the metal parts containing the coating are more susceptible to abrasion. Examples of such hydrocarbon resins include cumarone-indenes, polystyrenes, polymerized beta-pinenes, and higher molecular weight polyisobutenes. Obviously, the resins chosen to be added to a particular composition must be miscible with the composition and soluble in any solvent used to prepare the composition.

In some instances, it may be desirable to incorporate additional corrosion-resistant compositions to the compositions of this invention where special or extremely severe corrosion producing conditions exist. It may also be desirable to add a small amount of dye to the compositions of this invention where it is desired to improve the appearance of the coating composition.

In some applications, it may be desired to remove the coatings of this invention after the drawing and welding operations have been completed. The coating may be modified to facilitate its removal by incorporating therein, wetting agents such as commercial mixtures of condensation products of primary fatty amines and alkalene oxides, and polyol derivatives such as sorbitan monooleate and polyoxyethylene sorbitan mono-oleate.

The following compositions illustrate the phosphorus- and metal-containing compositions of this invention. Solvent A is a 50:50 mixture of butyl Cellosolve (ethylene glycol monobutyl ether) and SC-100 (a commercial aromatic solvent having a Kauri butanol number of 94.8 and a boiling point range of 321°–349° F.)

Composition A: Parts by weight
   Product of Example 7 _____ 87.5
   Product of Example 9 _____ 12.5

Composition B:
   Product of Example 6 _____ 76.4
   Product of Example 9 _____ 23.6

Composition C:
   Product of Example 7 _____ 70.0
   Product of Example 9 _____ 30.0

Composition D:
   Product of Example 7 _____ 87.8
   Product of Example 11 _____ 12.2

Composition E:
   Product of Example 7 _____ 15.2
   Product of Example 11 _____ 2.2
   Solvent A _____ 82.6

Composition F:
   Product of Example 7 _____ 27.6
   Product of Example 11 _____ 3.8
   Solvent A _____ 68.6

Composition G:
   Product of Example 7 _____ 29.2
   Product of Example 9 _____ 4.1
   Solvent A _____ 66.7

Composition H:
   Product of Example 7 _____ 27.1
   Product of Example 9 _____ 8.4
   Solvent A _____ 65.0

Composition I:
   Product of Example 7 _____ 25.5
   Product of Example 9 _____ 10.9
   Solvent A _____ 64.6

Composition J:
   Product of Example 7 _____ 19.6
   Product of Example 11 _____ 2.7
   Solvent A _____ 77.7

Composition K:
   Product of Example 7 _____ 21.8
   Product of Example 11 _____ 3.0
   Solvent A _____ 75.2

Component L: Parts by weight
   Product of Example 6 _____ 20.6
   Product of Example 11 _____ 2.8
   Commercial mixture of tertiary amines prepared by the condensation of ethylene oxide with primary fatty amines _____ 1.6
   Solvent A _____ 76.0

Composition M:
   Product of Example 6 _____ 21.8
   Product of Example 11 _____ 3.2
   2-ethyl hexylamine _____ 1.4
   Solvent A _____ 73.6

Composition N:
   Product of Example 1 _____ 22.0
   Product of Example 17 _____ 1.5
   Butyl Cellosolve _____ 76.5

Composition O:
   Product of Example 3 _____ 13.5
   Product of Example 18 _____ 2.5
   Methyl isobutyl ketone _____ 84

Composition P:
   Product of Example 7 _____ 12.5
   Product of Example 19 _____ 4.5
   Polystyrene resin having a softening point of 110°–120° C. _____ 8.0
   Methyl isobutyl ketone _____ 75.0
   Red dye solution (10% in butyl Cellosolve) __ 0.01

The novel, phosphorus- and metal-containing compositions of this invention are principally useful to provide corrosion protection for metal surfaces. To accomplish this, the metal surfaces are provided with a thin film of the composition varying from about 10 to about 800 milligrams and preferably from about 100 to about 600 milligrams per square foot of surface area. Such films may be applied to the surface area by any of the ordinary techniques used in the paint industry such as, e.g., brushing, spraying, dipping, or roller-coating. Depending on the particular mode of application selected, the compositions may be dissolved or prepared in a solvent such as petroleum aromatic spirits, benzene and toluene, to a viscosity best suited for the mode of application. In dipping operations, for example, 50% solutions of the compositions in toluene or aromatic petroleum spirits have been found to yield a thin film which, when dry, ranges from about 100–500 milligrams per square foot of surface area. When the composition is to be sprayed on an article, a solution containing from about 10–20% solids is preferred. When the article is to be roller-coated, higher concentrations may be used such as, for example, from 20–30% solids or higher.

The compositions of this invention may be applied to either cold or hot metal surfaces. When applied to cold metal surfaces, the film is dried by heating at a temperature of from about 200–500° F. for a period of from about 3–10 minutes or until dry. When applied directly to a hot piece of metal, additional heating may not be required. The coated panels may be air cooled or cooled by immersion in a cold water bath.

The compositions of this invention are useful in retarding the corrosion of many kinds of metals, including iron, steel, ferrous alloys, zinc, aluminum, cadmium and magnesium. They are effective also in extending the life of the so-called "phosphated" metal surfaces, that is, surfaces which have been treated with an aqueous inorganic phosphate solution to form thereon an integral, adherent inorganic phosphate coating. Such coatings are widely used in the automotive and appliance industries as bases to insure good adhesion of decorative top-coats such as paint, enamel, varnish, alkyd resins, epoxy resins, and the like. Generally, these inorganic phosphate coatings have inadequate corrosion resistance, that is, not much better than that of the bare metal. Thin films of the compositions of the present invention have provided an answer to this problem by extending the anti-corrosion life of phosphated ferrous metal parts.

The ability of metal surfaces which have been coated with the compositions of this invention to resist corrosion is shown by the results of the following condensing humidity test. In this test, 4″ x 8″ 20-gauge SAE 1020 cold-rolled steel panels (no top-coat) were placed in a horizontal position approximately 3″ above a pan of water in an enclosed cabinet. The water in the pan was heated to a temperature sufficient to produce a vapor temperature within the cabinet of 120° F. as measured by a thermometer which was suspended in the cabinet above the surface of the water. After being exposed in this manner for 20 hours, the panels were removed and inspected for rust. The results of this condensing humidity test, as shown in Table I, indicate that the coatings deposited by the compositions of this invention are effective to reduce the corrosion of steel surfaces.

TABLE I.—TWENTY-HOUR CONDENSING HUMIDITY TEST

| Panel Treatment | | Test Results, Percent Rust-Free Film |
| --- | --- | --- |
| Coating Composition [1] | Cooling Method | |
| None | | 0 |
| K | Air | 99 |
| K | Water | 90 |
| L | Air | 85 |
| L | Water | 85 |
| M | Air | 20 |
| M | Water | 20 |

[1] Coating weight approx. 200 mg./ft.²; baking temperature, 250° F.

After a metal article has been treated in accordance with the present invention, it is often desirable to apply a decorative and protective top-coat of a siccative organic coating composition such as paint, lacquer, varnish, synthetic resins, enamel, and the like. Examples of synthetic resins which may be used are the acrylic, alkyd, epoxy, phenolic, and polyvinyl alcohol resins.

The following examples illustrate the siccative organic coating compositions which may be applied to metal articles which have ben phosphated in accordance with this invention:

Example A (white alkyd baking primer)

| | Percent |
| --- | --- |
| Titanium dioxide | 18 |
| Barium sulfate | 12 |
| Magnesium silicate | 10 |
| Short soya alkyd (50% solution in xylene of alkyd resin prepared from 41.6 parts of phthalic anhydride, 18.4 parts of glycerol and 40 parts of soya bean acid) | 45 |
| Xylene | 14.8 |
| Cobalt naphthenate (6% Co) | 0.1 |
| Anti-skinning agent | 0.1 |

Example B (red oxide resin modified alkyd baking primer)

| | |
| --- | --- |
| Red iron oxide (85% Fe₂O₃) | 20.9 |
| Barium sulfate | 8.2 |
| Magnesium silicate | 8.2 |
| Resin modified alkyd (70% xylene) | 28.6 |
| Naphtha | 6.6 |
| Xylene | 21.8 |
| Mineral spirits | 5.5 |
| Cobalt naphthenate (6% Co) | 0.2 |

Example C (white alkyd baking topcoat)

| | |
| --- | --- |
| Titanium dioxide | 29.2 |
| Medium castor alkyd (50% solution in xylene of an alkyd resin prepared from 38 parts of phthalic anhydride, 14 parts of glycerol, and 48 parts of castor oil) | 48.6 |
| Mineral spirits | 19.9 |
| Xylene | 2.2 |
| Cobalt naphthenate (6% Co) | 0.1 |

Example D (white acrylic baking topcoat)

| | Percent |
| --- | --- |
| Titanium dioxide | 25.0 |
| Thermosetting acrylic resin (50% in xylene) | 60.0 |
| Xylene | 12.2 |
| Cellosolve acetate | 2.7 |
| Anti-skinning agent | 0.1 |

Example E (white alkyd baking topcoat)

| | |
| --- | --- |
| Titanium dioxide | 28.4 |
| Medium cottonseed alkyd resin (a 60% solution of an alkyd prepared from 40 parts of phthalic anhydride, 25 parts of glycerol, and 35 parts of cottonseed oil in xylene) | 48.8 |
| High flash naphtha | 1.5 |
| Xylene | 21.2 |
| Cobalt naphthenate (6% Co) | 0.1 |

Example F (white vinyl baking topcoat)

| | |
| --- | --- |
| Titanium dioxide | 20.0 |
| Resin stabilizer | 0.7 |
| Vinyl chloride-vinyl acetate copolymer (85:15) w. | 12.5 |
| Toluene | 29.5 |
| Methyl isobutyl ketone | 29.5 |
| Epichlorohydrin | 0.1 |
| Methanol | 0.1 |
| Tricresyl phosphate | 7.2 |

Example G (white modified alkyd baking topcoat)

| | |
| --- | --- |
| Titanium dioxide | 26.8 |
| Zinc oxide | 1.4 |
| Medium coconut alkyd resin (60% solution in xylene of an alkyd resin prepared from 40 parts of phthalic anhydride, 25 parts of glycerol and 35 parts of coconut oil) | 36.4 |
| Urea (50% xylene solution) | 9.4 |
| Melamine (50% xylene solution) | 9.4 |
| Xylene | 16.6 |

Example H (red lead alkyd air dry primer)

| | |
| --- | --- |
| Red lead | 67.1 |
| Aluminum stearate | 0.2 |
| Medium linseed soya alkyd (50% solution in mineral spirits of an alkyd resin prepared from 38% phthalic anhydride, 14% glycerol, and 48% of a mixture of linseed and soya bean oils) | 27.5 |
| Petroleum spirits | 4.7 |
| Methylene bis-2,6-di-t-butylphenol | 0.4 |
| Cobalt naphthenate (6% Co) | 0.1 |

Example I (white alkyd baking topcoat)

| | |
| --- | --- |
| Titanium dioxide | 29.1 |
| Medium castor alkyd (50% solution in xylene of an alkyd resin prepared from 37 parts of phthalic acid, 15 parts of glycerine, and 48 parts of castor oil) | 48.7 |
| Mineral spirits | 22.1 |
| Cobalt naphthenate (6% Co) | 0.1 |

Application of the siccative organic coating compositions can be effected by any of the ordinary techniques such as brushing, spraying, dipping, roller-coating, flow-coating, etc. The topcoated article is dried in the manner best suited for the particular siccative organic coating composition employed such as air-drying at ambient temperature, drying in a current of hot air, baking in an oven, or baking under a battery of infra-red lamps. In most instances, the thickness of the dried film of the siccative organic coating composition will be within the range of from about 0.1 to about 10 mils, more often from about 0.3 to about 5 mils.

The following two tests are used to demonstrate the efficacy of the compositions of this invention in improving the adhesion of films of siccative organic coating compositions to metal articles such as aluminum, steel and galvanized steel. The results of these tests indicate clearly the utility of the compositions of this invention.

Olsen Cup Test

A number of clean 4" x 8" panels of 20-gauge SAE 1020 cold-rolled steel were immersed in solutions containing the compositions of this invention, withdrawn at the rate of 4 inches per minute, and baked for 5 minutes at 460° F. After the coating weight was determined, the panels were top-coated with a grey-vinyl alkyd paint by roller coating and the panels were then baked for 2 minutes at 475° F. The application of the paint was controlled to give a paint thickness of about 0.4–0.5 mils.

The test apparatus, which measures the adhesion of a coating composition to a metal surface under severe deformation conditions, consists of a device in which the coated test panel is securely clamped and then deformed. Access is provided to the panel through a 1-inch diameter circular opening. Through this opening a 7/8-inch diameter rounded cylindrical piston is forced against the panel until the resulting dimple ruptures. The panel is then removed and pressure sensitive tape is applied to the convex surface of the dimple. This procedure is repeated until no more paint can be removed in this manner. The amount of paint which remains on the convex surface is measured and recorded.

The results obtained in this test are shown in Table II.

TABLE II.—OLSEN CUP TEST

| Metal Treatment Before Painting | Coating Weight (mg./ft.²) | Percent Paint Adhesion |
|---|---|---|
| None | | 60 |
| Composition G | 182 | 90 |
| Composition H | 182 | 90 |
| Composition I | 176 | 85 |

Salt Fog Corrosion Test

A number of 4" x 8" panels of 20-gauge SAE 1020 cold-rolled steel were coated in the manner described above. The paint film on each panel was ruptured by scoring a 6-inch line on the surface of each panel. The scored panels were then subjected to the Salt Fog Test according to which the panels were placed in a cabinet containing a 5% aqueous sodium chloride solution at 95° F. Air was bubbled through the solution to produce a corrosive salt atmosphere which acts on the surface of the test panels which were suspended above the level of the salt solution. The panels were allowed to remain in this atmosphere for 100 hours. The panels were then removed from the salt fog atmosphere, washed with water, and dried with a cloth. A pressure sensitive tape was then applied to the panel and removed suddenly. The procedure was repeated until no more paint could be removed in this manner. The panels were inspected to determine the amount (percent) of paint still adhering to the metal substrate. The loss of adhesion caused by corrosion from the scribed line is measured in thirty-seconds of an inch. This corrosion along the scribed line is called "creep." The results of the salt fog corrosion test, shown in Table III, indicate that the compositions of this invention, when applied to a metal surface before said surface is painted, substantially improved the adhesion of the paint to the substrate, and improved the rust preventive properties of the panel coatings as demonstrated by the improved resistance to under-cutting by corrosion from the scribed line.

TABLE III.—SALT FOG CORROSION TEST

| Paint Base | | Test Results (100 hrs.) | |
|---|---|---|---|
| Composition | Coating Weight (mg./ft.²) | Creep (1/32") | Percent Paint Adhesion |
| None | | >10 | 25 |
| G | 182 | 0.5–1 | 98 |
| H | 182 | 2–4 | 96 |
| I | 176 | 5–6 | 92 |

Metal articles which have been coated in accordance with the process of this invention are easily welded. This property is especially significant because such coatings on metal surfaces generally prevent welding or cause the welding of such treated metal articles to be extremely difficult. The welding operation may be carried out by the use of procedures and equipment commonly employed for the purpose. No special precautions are necessary and adjustments with respect to welding current, welding time, and electrode pressure may be made in the manner known to those versed in the art of welding.

It has been found that the strength of a spot-welded coated metal article prepared in accordance with the process of this invention is equivalent to that of a conventional, welded uncoated metal article. Thus, the advantages of a metal article of this invention with respect to corrosion resistance and paint adhesion are achieved with no sacrifice of weld strength.

Welding Test

A number of clean, degreased, 4" x 8" panels of SAE 1020 20-gauge cold-rolled steel were dip-coated with compositions of this invention by the usual procedure. After baking for 5 minutes at the given temperature, the panels were cooled quickly by immersion in cold water. Two panels coated with the same composition were then clipped together with insulated clips and the edges are insulated with a piece of paper. The panels are then spot-welded together using 1/4" truncated cone electrodes at a net electrode pressure of 600 pounds. The variable welding conditions, namely maximum secondary current and weld time, as well as the results obtained in these tests are found in Table IV. The results of this test indicate that steel surfaces which have been coated in accordance with the process of this invention are easily welded. Furthermore, the weldability of the coated panels is not affected by the manner in which the hot coated panels are cooled.

TABLE IV.—WELDING TEST

| Metal Treatment | | | Welding Conditions [1] | | Result |
|---|---|---|---|---|---|
| Composition | Coating Weight (mg./ft.²) | Baking Temp. (° F.) | Maximum Secondary Current (amperes) | Weld Time (cycles) | |
| F | 250 | 325 | 11,700 | 8 | Welded. |
| J | 100 | 300 | 10,710 | 8 | Do. |
| K | 150 | 300 | 10,710 | 8 | Do. |
| L | 200 | 250 | 10,710 | 8 | Do. |
| L | 200 | [2] 250 | 10,710 | 8 | Do. |
| M | 200 | 250 | 10,710 | 8 | Do. |
| M | 200 | [2] 250 | 10,710 | 8 | Do. |

[1] Net electrode pressure: 600 lbs.; 1/4" truncated cone electrode.
[2] These panels were air cooled after baking.

As mentioned previously, the coatings deposited by the compositions of this invention are particularly useful in the preparation of metals for drawing and forming operations. Before a metal is subjected to a drawing operation, it is generally covered with a lubricant. Metal drawing lubricants are generally classified into two groups commonly referred to as "wet lubricants" and "dry lubricants." Both types are applied as liquids, the "wet lubricant" remaining liquid, but the "dry lubricant" being dried to form a solid film. The wet lubricants are more easily applied and require a minimum amount of floor space and equipment. These lubricants are usually applied by spraying, swabbing, or with a roller. Spraying is generally unsatisfactory because of the waste due to overspraying.

The application of a "dry lubricant" to a metal surface requires, in addition to the coating step, a drying step. Since the effectiveness of a dried lubricant is dependent upon the degree of dehydration of the film, the lubricity of the film increasing as the amount of residual water decreases, it is necessary to remove substantially all of the water from the film.

Examples of lubricants which have been found useful as aids in the drawing of metal include petroleum oils, e.g., 5,000 S.S.U. at 100° F.; chlorinated wax; soaps prepared by neutralizing mixed fatty acids with a mixture of amines and caustic soda; dispersions of such soaps; beeswax; dry soap type films; heavy or light-duty pigmented emulsions; heavy duty non-pigmented emulsions; etc. The following lubricants are examples of coating compositions which will produce films which have satisfactory drawing properties.

Drawing lubricant A: Percent
    Tetraethylene pentamine _____ 3.2
    Sodium hydroxide _____ 3.5
    Oleic acid _____ 22.8
    Water _____ 71.5

Drawing lubricant B:
    Triethanolamine _____ 5.0
    Sodium hydroxide _____ 1.8
    Tall oil _____ 23.2
    Water _____ 70.0

Drawing lubricant C:
    Monoethanolamine _____ 2.8
    Potassium hydroxide _____ 2.5
    Coconut fatty acids _____ 24.7
    Water _____ 70.0

Drawing lubricant D:
    Monoisopropanolamine _____ 3.0
    Potassium hydroxide _____ 1.0
    Soya bean fatty acids _____ 23.5
    Polyoxyethylene trioleate _____ 8.0
    Water _____ 64.5

Drawing lubricant E:
    Sodium tallow soap _____ 16.0
    Potassium carbonate _____ 20.0
    Boric acid _____ 20.0
    Borax _____ 38.0
    Polyethylene glycol (molecular weight 6000) _ 6.0

Drawing lubricant F:
    Sodium tallow soap _____ 15.0
    Borax _____ 85.0

Drawing lubricant G:
    Sodium stearate _____ 45
    Sodium sulfite _____ 4
    Borax _____ 38
    Water _____ 5

Drawing lubricant H:
    Chlorinated wax (50% chlorine) _____ 20
    SAE 40 mineral lubrication oil _____ 50

The solid lubricants such as those illustrated by Lubricants E and F may be applied to the metal surface in paste form by adding a small amount of water, or the metal surface may be coated by immersion in a boiling solution containing about 1 pound of the lubricant per gallon of water.

The lubricant which is chosen for this purpose must have the ability to allow the metal to flow properly and to minimize galling and scoring of the tools and/or the fabricated parts. Thus, an important feature of any lubricant system is the ability of the lubricant to reduce or control friction. The advanage of depositing the coating of this invention on metal surfaces prior to lubrication and drawing, is demonstrated by the following laboratory test which provides a method of measuring the coefficient of friction of treated and untreated steel panels.

Friction Test

In this test, a lubricated test strip (2" x 24") is placed between a pair of flat polished dies upon which is placed a load by means of a calibrated torque wrench acting on a screw. The dies may be heated to increase the severity of the test condition. This assembly is mounted in a tensile testing machine and the metal strip is moved through the dies. The force (measured in pounds) required to move the strip at a rate of 4 inches per minute through the dies at a given temperature and jaw load is observed and recorded. The results of the test are reported in terms of "dynamic coefficient of friction" which is defined by the following equation:

$$\text{dynamic coefficient of friction} = \frac{\text{force (lbs.) required to move the slip at rate of 4 inches/minutes through the the dies}}{\text{total jaw load (lbs.)}}$$

The more desirable metal treatments, therefore, are characterized by a low "dynamic coefficient of friction." This friction test is described in detail by W. J. Wojtowicz in Lubricating Engineering, Vol. II, pages 174–7 (1955). The coating was applied to the steel by the following procedure. The panel was (1) immersed in the coating solueion at room temperature; (2) withdrawn at the rate of 4 inches per minute, and allowed to drip dry; (3) baked in oven for 5 minutes; and (4) air cooled. The results of this simple sliding friction test on lubricated hot-rolled and cold-rolled steel panels, summarized in Table V, indicate the utility of the coating compositions of this invention in reducing the coefficient of friction of coated steel.

TABLE V.—COEFFICIENT OF FRICTION TEST [1]

| Steel Type | Base Treatment | | | Dynamic Coefficient of Friction [2] |
|---|---|---|---|---|
| | Coating Composition | Coating Weight (mg./ft.[2]) | Baking Temp. (° F.) | |
| Cold-rolled | None | | | 0.072 |
| Do | E | 50 | 300 | 0.036 |
| Do | E | 50 | 250 | 0.036 |
| Do | F | 200 | 250 | 0.014 |
| Do | F | 200 | [3] 250 | 0.023 |
| Do | J | 100 | 250 | 0.021 |
| Do | K | 150 | 250 | 0.017 |
| Do | K | 150 | 300 | 0.009 |
| Hot-rolled | None | | | 0.072 |
| Do | K | 150 | 250 | 0.021 |
| Do | J | 100 | 250 | 0.051 |

[1] A commercial drawing lubricant is applied to the panels before testing.
[2] Jaw load, 20,000 lbs.; die temperature, 180° F.
[3] After baking, the hot panel was cooled quickly by quenching in cold water.

The durability and versatility of the coatings deposited in the process of this invention are shown by the following procedure which compares the corrosion resistance of coated and non-coated steel panels which have been further coated with a drawing lubricant and subjected to a modified Olsen Cup test.

Modified Olsen Cup Test

A number of 4" x 8" panels of 20-gauge SAE 1020 hot-rolled steel were prepared for the test according to the following schedule:

Step: Description
  1—Immerse the panels for 7 minutes in a solution maintained at 160°–170° F. and prepared from 4380 parts of water, 636 parts of sulfuric acid, and 27 parts of iso-octyl phenyl polyethoxy ethanol.
  2—Rinse the panels with (a) water and (b) acetone.
  3—Force dry the panel with air.
  4—Dip-coat the panels with the compositions of this invention according to the procedure described in the Olsen Cup test.
  5—Bake the coated panel for 5 minutes at 250° F. and cool.
  6—Dip-coat the panels with a commercial drawing lubricant and bake for 5 minutes at 200° F.
  7—Deform each panel in the Olsen Cup machine to form a dimple. The deformation is stopped just prior to rupture. (The point of rupture was determined after several hot-rolled steel panels were deformed.) The panels are deformed in this manner to simulate drawing and forming operations.

The ability of the coated panels to withstand such a forming operation and maintain its corrosion inhibiting properties is demonstrated by the following humidity tests. The results of both tests indicate clearly that steel surfaces which have been coated with the compositions of this invention and with a drawing lubricant may be subjected to drawing and forming operations without destroying the corrosion inhibiting properties of the coating.

Condensing Humidity Test

In this test, the treated panels are placed in the condensing humidity cabinet described earlier; the conditions of the test are the same. The panels are observed periodically to determine the amount of rusting on the panels. The results of this humidity test, shown in Table VI, indicate that steel surfaces which have been coated with the composition of this invention, and subsequently with a drawing lubricant, may be deformed without any loss in corrosion resistance.

TABLE VI.—CONDENSING HUMIDITY TEST

| Metal Treatment | | | Test Results (Percent of Panel Rusted) | | |
| --- | --- | --- | --- | --- | --- |
| Composition | Commercial Drawing Lubricant | Deformed | 7 hours | 23 hours | 49 hours |
| None | No | No | 100 | 100 | 100 |
|  |  | Yes | 100 | 100 | 100 |
| Do | Yes | No | 72 | 20 | 98 |
|  |  | Yes | 72 | 30 | 98 |
| F [1] | Yes | No | 0 | 0 | 1 |
|  |  | Yes | 0 | 0 | 1 |
| F [2] | Yes | No | 0 | 0 | 1 |
|  |  | Yes | 0 | 0 | 1 |

[1] Air cooled after baking.
[2] Water cooled after baking.

The ability of the coatings deposited by the compositions of this invention to resist corrosion after deformation is shown also by the results of the following outdoor humidity test. In this test, the treated steel panels (no paint) were placed in a horizontal position approximately 2 feet above a pan of water in an enclosed outdoor shed. After being exposed in this manner for seven weeks, the panels were removed and inspected for rust. The results of this outdoor humidity test, as shown in Table VII, indicate that the coatings deposited by the compositions of this invention are effective to reduce the corrosion of steel surfaces which have been subjected to drawing or forming operations.

TABLE VII.—SEVEN-WEEK OUTDOOR HUMIDITY TEST

| Metal Treatment | | Test Results (Percent rust) | | |
| --- | --- | --- | --- | --- |
| Composition | Commercial Drawing Lubricant | Dimple | | Complete Panel |
| | | Concave | Convex | |
| None | No | 100 | 100 | 100 |
| Do | Yes | 75 | 95 | 85 |
| F [1] | Yes | 50 | 50 | 5 |
| F [2] | Yes | 35 | 40 | 3 |

[1] Air cooled after baking.
[2] Water cooled after baking.

What is claimed is:

1. A phosphorus- and metal-containing composition comprising
    (A) a composition comprising a mixture of one part of a copolymer of allyl alcohol and a styrene, said copolymer having an average molecular weight of from about 500 to about 2500, from about 0.05 about 5.0 parts of an epoxy aryl ether, and from about 0.1 to about 2.0 parts of phosphoric acid, and
    (B) a metal salt obtained by reacting from about 0.2 to about 1 mole of a metal base with 1 mole of a phosphorus acid obtained by reacting one mole of phosphoric acid and up to about 6 moles of an organic epoxide,
the weight ratio of component (A) to component (B) being within the range of from about 1:1 to 20:1.

2. The composition of claim 1 wherein the metal of the metal base of component (B) is selected from the class consisting of alkali earth metals, zinc, cadmium, manganese, iron, cobalt, copper, tin, and aluminum.

3. The composition of claim 1 wherein the epoxy aryl ether of component (A) is prepared by the reaction of an epihalohydrin with a phenolic compound.

4. The composition of claim 1 wherein component (B) is a zinc salt.

5. A phosphorus- and zinc-containing composition comprising
    (A) a composition comprising a mixture of one part of a copolymer of allyl alcohol and a styrene, said copolymer having an average molecular weight of from about 500 to about 2500, from about 0.05 to about 5.0 parts of an epoxy aryl ether prepared by the reaction of epichlorohydrin with a polyhydric phenol, and from about 0.1 to about 2.0 parts of phosphoric acid, and
    (B) a zinc salt obtained by reacting from about 0.2 to about 1 mole of zinc oxide with a phosphorus acid obtained by reacting one mole of phosphoric acid with up to about 5 moles of propylene oxide,
the weight ratio of (A) to (B) being within the range of from about 1:1 to 20:1.

6. The composition of claim 5 wherein the phosphorus acid of component (B) is prepared by reacting 1 mole of phosphoric acid with from about 0.5 to about 2.5 moles of propylene oxide.

7. A phosphorus- and zinc-containing composition comprising
    (A) a composition comprising a mixture of 1 part of a copolymer of allyl alcohol in a styrene, said copolymer having an average molecular weight of from about 500 to about 2500, from about 0.05 to about 5 parts of an epoxy aryl ether prepared by the reaction of epichlorohydrin with a polyhydric phenolic compound, and from about 0.1 to about 2.0 parts of phosphoric acid, and
    (B) a zinc salt obtained by reacting from about 0.2 to about 1 mole of zinc oxide with a phosphorus acid obtained by reacting 1 mole of phosphoric acid and from 0.5 to 1.5 moles of propylene oxide,
the weight ratio of (A) to (B) being within the range of from about 5:1 to 15:1.

8. A process for providing a protective film for a metal surface which comprises contacting said metal surface with the composition of claim 1 and thereafter heating said film to a temperature from about 50°–300° C.

9. A process for providing a protective film for a metal surface which comprises contacting said metal surface with the composition of claim 5 and thereafter heating the metal to a temperature of from about 50°–200° C.

10. A metal article which has been provided with an adherent protective film in accordance with the method of claim 8.

11. A method for improving the adhesion of a siccative organic coating composition to metal articles which comprises contacting said metal articles with the composition of claim 1, and thereafter heating the metal to a temperature of from about 50°–200° C. prior to the application of said organic coating composition.

12. In a process for treating metal surfaces to facilitate cold drawing by producing an adherent film coating thereon, the novel steps of contacting said metal article with the phosphorus- and metal-containing composition of claim 1, and thereafter heating the metal article to a temperature of at least about 50° C.

13. In a process for treating metal surfaces to facilitate cold drawing by producing an adherent film thereon, the novel steps of contacting said metal article with the phosphorus- and zinc-containing composition of claim 5 and thereafter heating the metal surface to a temperature of at least about 50° C.

14. In a process for treating metal surfaces to facilitate the cold drawing thereof, the steps of
    (1) contacting said metal article with the phosphorus- and metal-containing composition of claim 1;
    (2) heating the metal article to a temperature of at least about 50° C. to provide an adherent coating thereon; and (3) contacting said coated metal surface with a drawing lubricant.

15. A method of preparing a cold drawn and welded metal article which comprises:
(1) contacting said metal article with the phosphorus- and metal-containing composition of claim 1;
(2) heating the metal article to a temperature of at least about 50° C. to provide a protective coating thereon;
(3) contacting said coated metal surface with a drawing lubricant;
(4) drawing the metal article; and then
(5) welding said coated metal article.

References Cited

UNITED STATES PATENTS 3,133,838   5/1964   Higgins _____ 260—837

MURRAY TILLMAN, *Primary Examiner.*

PAUL LIEBERMAN, *Assistant Examiner.*

U.S. Cl. X.R.

260—837, 47, 33.2, 33.4, 31.2, 31.4, 33.6, 37, 41, 40, 148—6.15, 6.16, 6.27; 117—75, 132, 161

L-636

UNITED STATES PATENT OFFICE
CERTIFICATE OF CORRECTION

Patent No. 3,429,945        Dated February 25, 1969

Inventor(s) John W. Forsberg and Richard W. Jahnke

It is certified that error appears in the above-identified patent and that said Letters Patent are hereby corrected as shown below:

Column 19, line 59, after "0.05" the word --to-- should be inserted; line 71, after "alkali" the words --metals, alkaline-- should be inserted.

Signed and sealed this 21st day of December 1971.

(SEAL)
Attest:

EDWARD M. FLETCHER, JR.      ROBERT GOTTSCHALK
Attesting Officer             Acting Commissioner of Patents